United States Patent
Koutari et al.

(10) Patent No.: US 10,903,465 B2
(45) Date of Patent: Jan. 26, 2021

(54) BATTERY BLOCK

(71) Applicant: SANYO Electric Co., Ltd., Daito (JP)

(72) Inventors: Masato Koutari, Hyogo (JP); Takuya Egashira, Hyogo (JP); Hiroshi Takata, Hyogo (JP); Shunsuke Yasui, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 112 days.

(21) Appl. No.: 16/312,012

(22) PCT Filed: May 9, 2017

(86) PCT No.: PCT/JP2017/017450
§ 371 (c)(1),
(2) Date: Dec. 20, 2018

(87) PCT Pub. No.: WO2018/003291
PCT Pub. Date: Jan. 4, 2018

(65) Prior Publication Data
US 2019/0207184 A1    Jul. 4, 2019

(30) Foreign Application Priority Data

Jun. 30, 2016  (JP) .................................. 2016-130806

(51) Int. Cl.
*H01M 2/10* (2006.01)
*H01M 2/12* (2006.01)
(Continued)

(52) U.S. Cl.
CPC ....... *H01M 2/1241* (2013.01); *H01M 2/1077* (2013.01); *H01M 2/206* (2013.01);
(Continued)

(58) Field of Classification Search
CPC .......................... H01M 2/1077; H01M 2/1241
See application file for complete search history.

(56) References Cited

U.S. PATENT DOCUMENTS

| 5,184,576 A | 2/1993 | Sajewski |
| 7,623,144 B2 | 11/2009 | Fotland et al. |

(Continued)

FOREIGN PATENT DOCUMENTS

| JP | 2003-162993 A | 6/2003 |
| JP | 2005-302427 A | 10/2005 |

(Continued)

OTHER PUBLICATIONS

International Search Report dated Jun. 13, 2017, issued in counterpart International Application No. PCT/JP2017/017450 (2 pages).

*Primary Examiner* — Olatunji A Godo
(74) *Attorney, Agent, or Firm* — Westerman, Hattori, Daniels & Adrian, LLP (57) ABSTRACT

A battery block is provided with: a plurality of cylindrical batteries of each of which the two ends are formed as positive and negative electrodes; and a lead plate which is connected to the electrodes of the cylindrical batteries. The cylindrical batteries are provided with battery cans having bottom plates provided with bottom surface electrodes and exhaust valves. The exhaust valves which are provided in the bottom plates open as a result of thin-walled lines breaking at a threshold pressure. The exhaust valves are provided inside the loop-shaped thin-walled lines provided in the bottom plates, said thin-walled lines having unconnected portions. The unconnected portions form hinge parts. Furthermore, the bottom surface electrodes provided in the bottom plates connect the lead plate to the hinge parts. The lead plate has cut-out portions provided in positions facing areas including the thin-walled lines.

7 Claims, 9 Drawing Sheets

(51) Int. Cl.
   *H01M 2/26*   (2006.01)
   *H01M 2/20*   (2006.01)
(52) U.S. Cl.
   CPC .......... *H01M 2/26* (2013.01); *H01M 2200/20* (2013.01); *H01M 2220/20* (2013.01)

(56) References Cited

U.S. PATENT DOCUMENTS

| | | |
|---|---|---|
| 7,671,565 B2 | 3/2010 | Straubel et al. |
| 2005/0079408 A1 | 4/2005 | Hirano |
| 2008/0003497 A1 | 1/2008 | Suzuki et al. |
| 2015/0380700 A1* | 12/2015 | Hasegawa ........... H01M 2/1223 429/54 |
| 2016/0049626 A1* | 2/2016 | Yasui .................. H01M 2/1016 429/54 |
| 2017/0047566 A1 | 2/2017 | Okuda et al. |

FOREIGN PATENT DOCUMENTS

| | | |
|---|---|---|
| JP | 2007-5075 A | 1/2007 |
| JP | 2016-100273 A | 5/2016 |
| WO | 2016/009586 A1 | 1/2016 |

* cited by examiner

BATTERY BLOCK

TECHNICAL FIELD

The present invention relates to a battery block in which a plurality of cylindrical batteries are connected by a lead plate. Especially the present invention relates to the battery block described in the following. In this battery block, cylindrical batteries are connected by a lead plate. These cylindrical batteries each have an exhaust valve which breaks when the inner pressure increases abnormally.

BACKGROUND ART

In a battery block which provides power to a driving motor of a hybrid car or an electric vehicle, the output and the charge and discharge capacity are enlarged by connecting a lot of secondary batteries in series or parallel. In order that this type of the battery block realizes or secures a high safety, the battery block is provided with an exhaust valve. This exhaust valve prevents harmful effects by rupture of the battery can. Since the exhaust valve opens when the inner pressure becomes higher than a threshold pressure, the rupture of the battery can is prevented. Further, the exhaust valve is connected to an exhaust duct, and high-temperature and high-pressure gas which is emitted in a state of the open valve, is safely exhausted outside the battery block. In order to realize this, a secondary battery is developed where a sealing plate has an exhaust valve (refer to Patent Literature 1).

Figure 7:
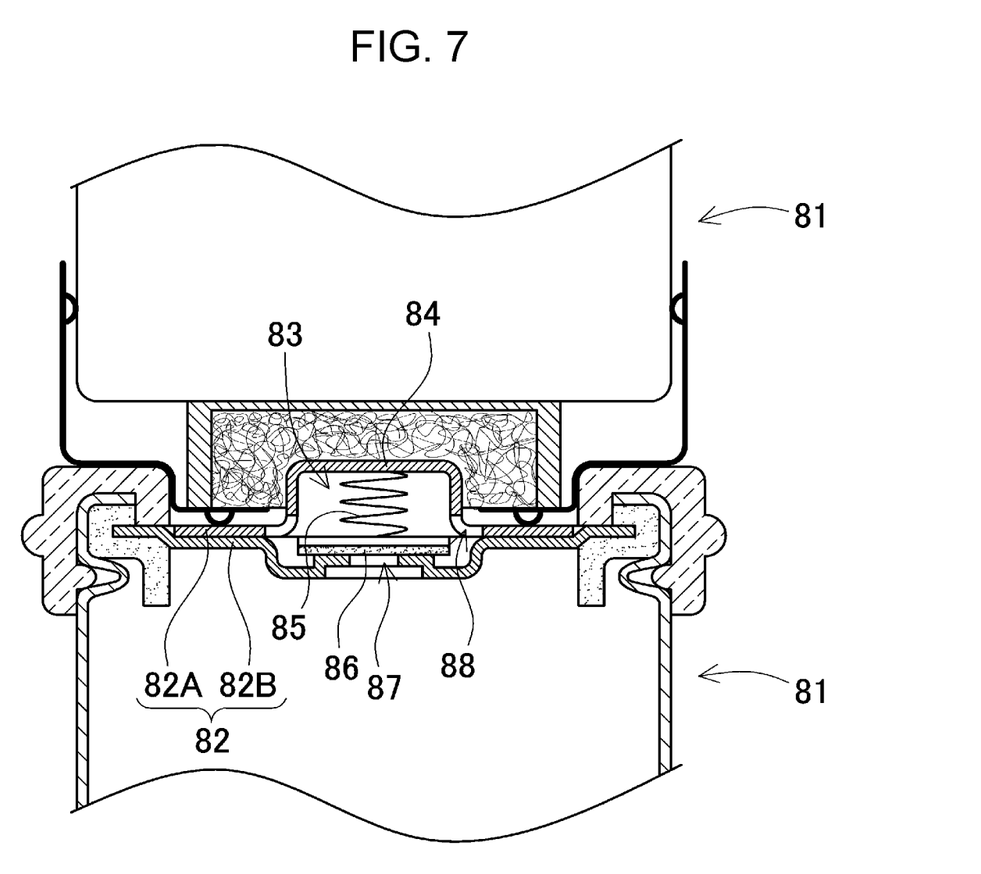
FIG. 7 is an enlarged sectional view of a conventional secondary battery.

As shown in a sectional view of FIG. 7, this secondary battery is provided with exhaust valves 83 at sealing plate 82 of cylindrical battery 81. In this cylindrical battery 81 of this figure, two sheets of metal plates are stacked as sealing plate 82, coil spring 85 is disposed inside projecting electrode 84 which upper metal plate 82A includes, and valve member 86 urged by this coil spring 85, is resiliently pressed to the surface of lower metal plate 82B. Lower metal plate 82B is provided with through hole 87, and valve member 86 is pressed so as to close this through hole 87. This secondary battery is in a state of closed valve where valve member 86 is pressed to lower metal plate 82B, when the inner pressure of the battery case is lower than the threshold pressure. When the inner pressure becomes higher than the threshold pressure, exhaust valves 83 is opened with valve member 86 pushed up. When exhaust valve 83 is opened, the high-temperature and high-pressure gas which passes through hole 87 is exhausted outside from small hole 88 disposed at projecting electrode 84. Therefore, there is a trouble that the high-temperature and high-pressure gas cannot be exhausted quickly.

Figure 8:
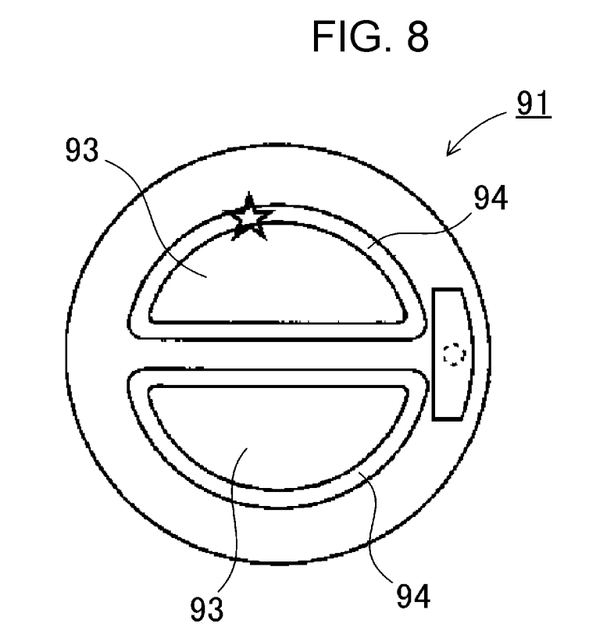
FIG. 8 is a plan view of a bottom plate of another conventional secondary battery.
Figure 9:
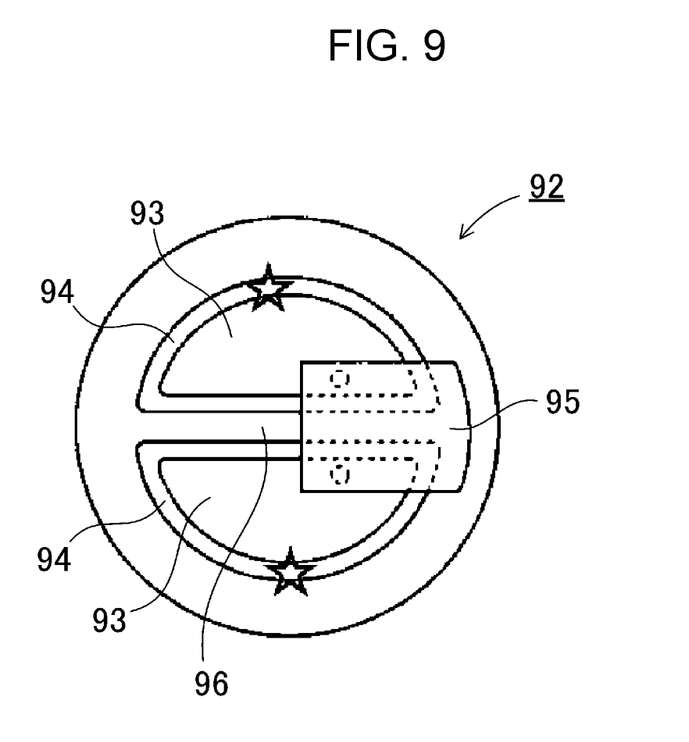
FIG. 9 is a plan view of a bottom plate of a further other conventional secondary battery.

In order to resolve this trouble, a secondary battery is developed where an exhaust valve is provided at a bottom plate of an outer can (refer to Patent Literature 2). The bottom plate of this secondary battery is shown in FIGS. 8 and 9. In each of bottom plates 91, 92 of these figures, thin-walled line 94 having a ring shape is disposed, and thereby exhaust valve 93 is made at the inside of thin-walled line 94. In each of the bottom plates 91, 92, two pieces of exhaust valves 93 are provided. In the bottom plate 91 of FIG. 8, it is difficult that two pieces of exhaust valves 93 are simultaneously opened. That is the reason why, once one of exhaust valves 93 is opened, the other of exhaust valves 93 is not opened as the inner pressure decreases. When neither of exhaust valves 93 is opened, and the opening area of exhaust valve 93 is small. Then, the inner gas cannot be quickly exhausted. In order to resolve this trouble, in bottom plate 92 of FIG. 9, two pieces of exhaust valves 93 are connected by inner tab 95 having high hardness. Then, by using the movement of opening the one of exhaust valves 93, the other of exhaust valves 93 can be opened and broken. In this bottom plate 92, both of exhaust valves 93 can be simultaneously opened. However, inner tab 95 connecting exhaust valves 93 restricts opening locations of the valves. That is the reason why, inner tab 95 is caught by rib 96 partitioning two pieces of exhaust valves 93, and thereby exhaust valve 93 cannot be opened sufficiently apart from bottom plate 92. Therefore, there is a fault that the inner gas cannot be quickly exhausted with both of exhaust valves 93 opened widely.

CITATION LIST

Patent Literature

Patent Literature 1: Unexamined Japanese Patent Publication No. 2007-5075
Patent Literature 2: Unexamined Japanese Patent Publication No. 2016-100273

SUMMARY OF THE INVENTION

In a battery block including a lot of secondary batteries, in a state where the exhaust valve is opened by thermal runaway of any one of the secondary batteries, it is very important that the thermal runaway does not cause another thermal runaway of an adjacent secondary battery. That is the reason why, when the thermal runaways are induced in a plurality of secondary batteries, the thermal runaways spread into the whole of the battery block. For example, when the exhaust valve is opened due to the thermal runaway of the lithium ion secondary battery, the extremely high-temperature and high-pressure gas of several hundreds degrees or more is emitted momentarily. Therefore, it is very important to surely prevent the thermal runaway from being induced. It is also very important to momentarily open the exhaust valve largely, and to quickly exhaust the high-temperature and high-pressure gas emitted through the opened exhaust valve outside from the exhaust duct.

Exhaust valves 93 disposed at bottom plates 91, 92 shown in FIGS. 8 and 9, can exhaust the inner gas more smoothly than exhaust valve 83 of sealing plate 82 shown in FIG. 7. It is very important to exhaust more quickly the inner gas, also through exhaust valves 93 of bottom plates 91, 92. That is the reason why the quick exhaust of the inner gas can improve the safety of the battery block.

The present invention is developed for achieving the above-mentioned purpose, and one of objects of the present invention is to supply a battery block which achieves very smooth discharge of internal gas from open exhaust valves, effectively inhibits the triggering of thermal runaway, and achieves a high degree of safety.

A battery block of one aspect of the present invention, includes:
- a plurality of cylindrical batteries of each of which the two ends are formed as positive and negative electrodes; and
- lead plates which are connected to the electrodes of the cylindrical batteries (1).
- The cylindrical batteries are provided with battery cans having bottom plates provided with bottom surface electrodes and exhaust valves. The exhaust valves which are provided in the bottom plates open as a result of thin-walled lines breaking at a threshold pressure.

The exhaust valves are provided inside the loop-shaped thin-walled lines provided in the bottom plates, said thin-walled lines having unconnected portions.

The unconnected portions form hinge parts.

Furthermore, the bottom surface electrodes provided in the bottom plates connect the lead plate to the hinge parts.

The one of the lead plates has cut-out portions provided in positions facing areas including the thin-walled lines.

The above-mentioned battery block which achieves smooth discharge of internal gas from open exhaust valves, effectively inhibits the triggering of thermal runaway, and secures a high degree of safety. That is the reason in a structure as follows. In the battery block, the loop-shaped thin-walled line having the unconnected portion is provided in the bottom plates, and the inside of the thin-walled line forms the exhaust valve. Further, the unconnected portion of the thin-walled line forms the hinge part, and the hinge part is provided with the bottom surface electrode to which the one of the lead plates is connected. Furthermore, the one of the lead plates has the cut-out portion provided in the position facing the area including the thin-walled line, and the opened exhaust valve is moved into the cut-out portion. Especially, in the battery block, the one of the lead plates is connected to the bottom surface electrode of the hinge part in the exhaust valve, and the opened exhaust valve is guided into the cut-out portion of the lead, and thereby the opening area of the exhaust valve is not restricted by the lead plate, and the inner gas can be smoothly exhausted from the opened exhaust valve. In the structure where the lead plate is connected to the exhaust valve, it is necessary that both of the lead plate and the hinge part of the exhaust valve are deformed at the time of opening the exhaust valve, but in the lead plate connected to the hinge part, the amount of the deformation by the opening exhaust valve is small, and the opening area of the exhaust valve is not restricted by a force of the deformation of the lead plate, and the angle of the opened valve in opening the exhaust valve is large and the opening area can be large. Additionally, by the structure where the opened exhaust valve is guided into the cut-out portion of the lead, it is less likely that the opened exhaust valve hits the lead plate and the angle of the opened valve is restricted into a small angle, and thereby the angle of the opened valve can be made large.

Figure 6:
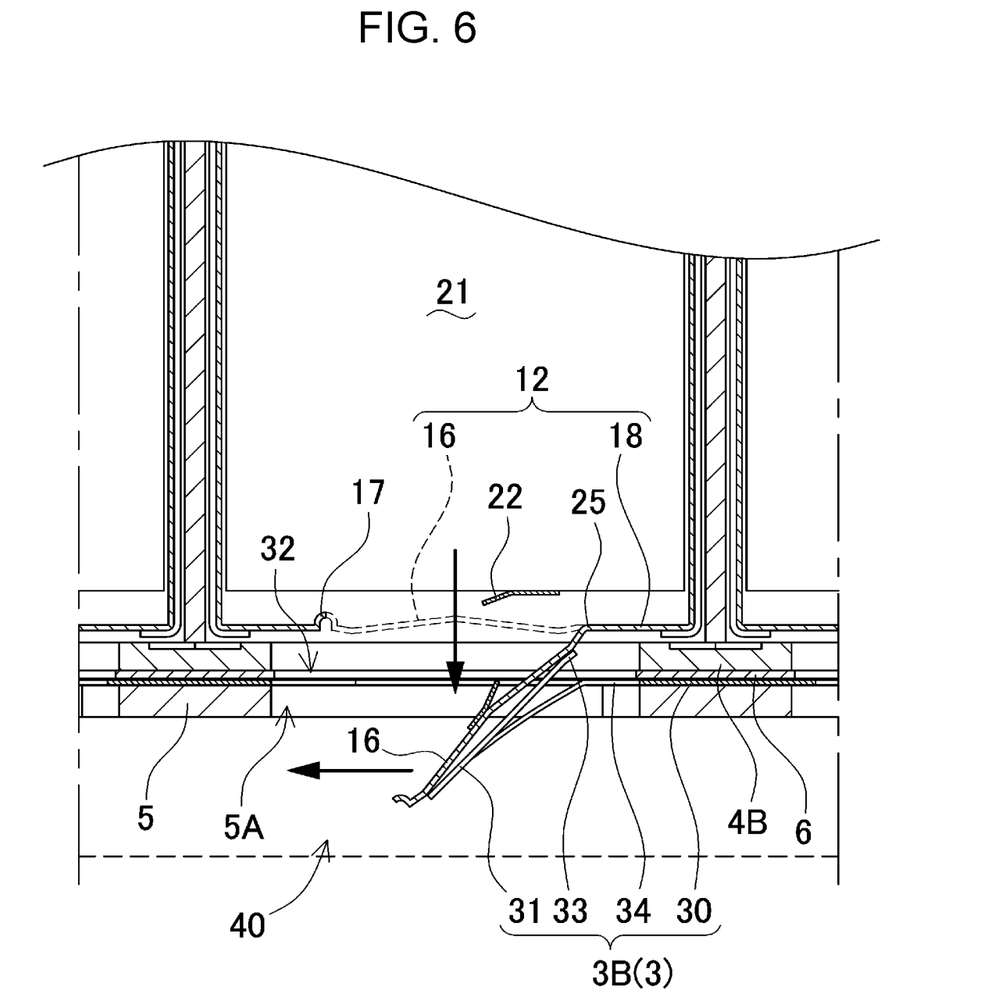
FIG. 6 is a sectional view showing a state where an exhaust valve of the cylindrical battery illustrated in FIG. 3 opens.

Further, in the battery block, in addition to that the angle of the opened valve can be made large, as shown in FIG. 6, the exhaust valve opened in the tilted posture, changes the flow direction of the inner gas to the exhausting direction of the exhaust duct, and the gas can be smoothly exhausted from the exhaust duct.

Further, in the battery block, by the structure where the exhaust valve provided at the bottom plate of the cylindrical battery is coupled to the bottom plate by the hinge portion, the exhaust valve can be opened without being separated from the bottom plate. Thereby, it is prevented, that the exhaust valve separated from the bottom plate by opening the valve is moved to the exhaust duct and this hinders the exhaust of the inner gas. Therefore, the opened exhaust valve changes the flow direction of the exhausted inner gas to smoothly guide into the exhaust duct, and the inner gas can be surely exhausted through the exhaust duct.

Therefore, in the battery block, when the inner pressure of the cylindrical battery becomes more than the threshold pressure and the thin-walled line is broken and the exhaust valve is opened, the angle of the opened valve is less likely restricted, and the flow direction of the inner gas is changed to the exhausting direction of the exhaust duct. By this characteristic structure, the inner gas can be smoothly exhausted. Accordingly, in the battery block, when the exhaust valve is opened due to the thermal runaway of any one of cylindrical batteries, the inner gas of this cylindrical battery is momentarily exhausted. Thus, this effectively prevents that the thermal runaway causes another thermal runaway of an adjacent cylindrical battery due to the delay in the exhaust of the inner gas, to remarkably improve the safety of the battery block.

Furthermore, the hinge part of the exhaust valve is provided with the bottom surface electrode to which the one of the lead plates is connected. Therefore, the lead plate is held to be connected to the bottom plate even in the valve opening state. In this battery block, a fuse as the protection element is connected in series to each of the cylindrical batteries, and by making a fusing current flow through the cylindrical battery having the opened valve, the fuse connected in series to the cylindrical battery can be fused. Thus, the cylindrical battery having the opened valve is separated from the other batteries, and the other batteries not having the opened valve are safely used in charge and discharge.

In the battery block of the present invention, the one of the lead plates includes resilient arms of which tip portions are connected to the bottom surface electrodes and roots are provided in positions facing the hinge parts of the exhaust valves, and widths of the roots of the resilient arms are narrower than widths of the hinge parts of the exhaust valves.

In the battery block, since the lead plate is connected to the bottom surface electrode through the resilient arm, a restricting force by the lead plate of the angle of the opened valve is made small, and the exhaust valve can be largely opened. Especially, since the root of the resilient arm of the lead plate is disposed at the hinge part of the exhaust valve and the width of the root is narrower than the width of the hinge part, the amount of the deformation in the root of the lead plate by opening the exhaust valve is small, the lead plate can be easily deformed. Therefore, the angle of the opened valve of the exhaust valve can be made large, and the inner gas can be quickly exhausted.

In the battery block of the present invention, the resilient arms are each in a loop-shape which extends along the inside of each of the thin-walled lines.

In the above-mentioned battery block, since the lead plate is connected to the bottom surface electrode through the long resilient arm, a restricting force by the lead plate of the angle of the opened valve is made small, and the exhaust valve can be largely opened. Therefore, in opening the exhaust valve, the inner gas can be quickly exhausted. Further, since the fine and long resilient arm is easily resiliently deformed, the relative position shift of the cylindrical battery connected to the lead plate, can be reasonably absorbed, and the connecting portion of the bottom surface electrode and the resilient arms can be protected. Furthermore, in the resilient arm of the lead plate ultrasonic-welded to the bottom plate, since the tip portion of the resilient arm is efficiently ultrasonic-vibrated with the resilient arm easily deformed, the lead plate can be stably connected to the bottom surface electrode. As the tip portion of the resilient arms is efficiently ultrasonic-vibrated, the output power of the ultrasonic vibrator can be made small, and the resilient arm can be surely connected to the bottom surface electrode. Therefore, the damage of thin-walled line in the ultrasonic-welding process connecting the lead plate to the bottom surface electrode can be decreased. This prevents the threshold pressure of the exhaust valve from being shifted, and the lead plate can be connected to the bottom surface electrode.

In the battery block of the present invention, the lead plate is connected to each of the bottom surface electrodes by ultrasonic-welding. In the battery block, even though the battery block and the lead plate are different kinds of metals, the lead plate can be stably connected to the bottom surface electrodes.

In the battery block of the present invention, an inner tab which is connected to an electrode plate housed in each of the battery cans, is welded to an inner surface of each of the exhaust valves, and the inner tab is a metal plate thinner than each of the bottom plates from which each of the exhaust valves separates in a state of a broken valve.

In this battery block, the inner tab is broken and separated in the valve opening state, and the opened valve can be widely opened.

In the battery block of the present invention, the lead plate connected to each of the bottom surface electrodes, in a metal plate having a thickness of 100 μm or more to 500 μm or less, and the metal plate is made of any one of aluminum, copper, nickel, iron, or an alloy of these metals.

In the battery block of the present invention, a current collecting plate thicker than the lead plate is connected to the one of the lead plates connected to each of the bottom surface electrodes. In this battery block, the lead plate is stably surely connected to the cylindrical batteries, and the adjacent cylindrical batteries are connected by the current collecting plate having a low resistance, and the resistance loss of the connecting lead can be decreased.

In the battery block of the present invention, each of the cylindrical batteries is a nonaqueous secondary battery of a lithium ion secondary battery or the like.

DESCRIPTION OF EMBODIMENTS

Exemplary embodiments and examples of the present invention have been described with reference to the drawings. However, the exemplary embodiment described below shows a battery block for embodying the technical ideas of the present invention. The battery block of the present invention is not limited to the following. Further, in the present description, components shown in the scope of claims are not limited to the components of the exemplary embodiment.

Figure 1:
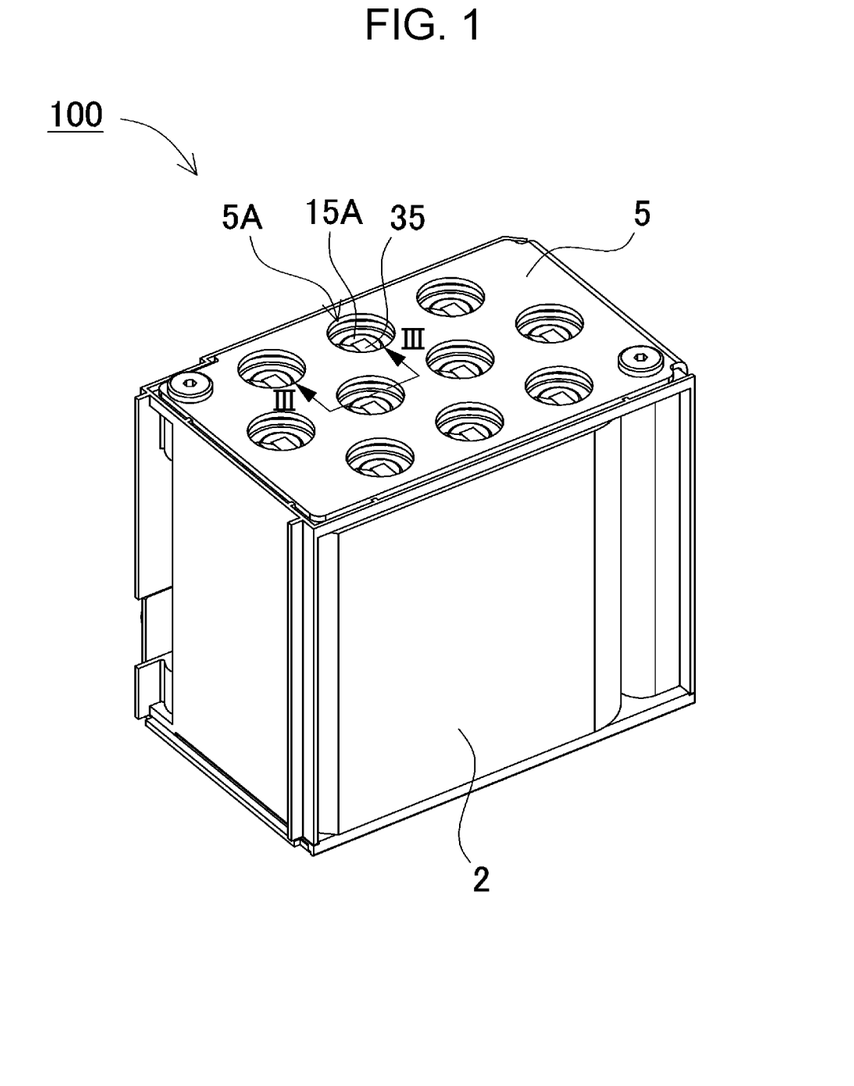
FIG. 1 is a perspective view of a battery block according to one exemplary embodiment of the present invention.
Figure 2:
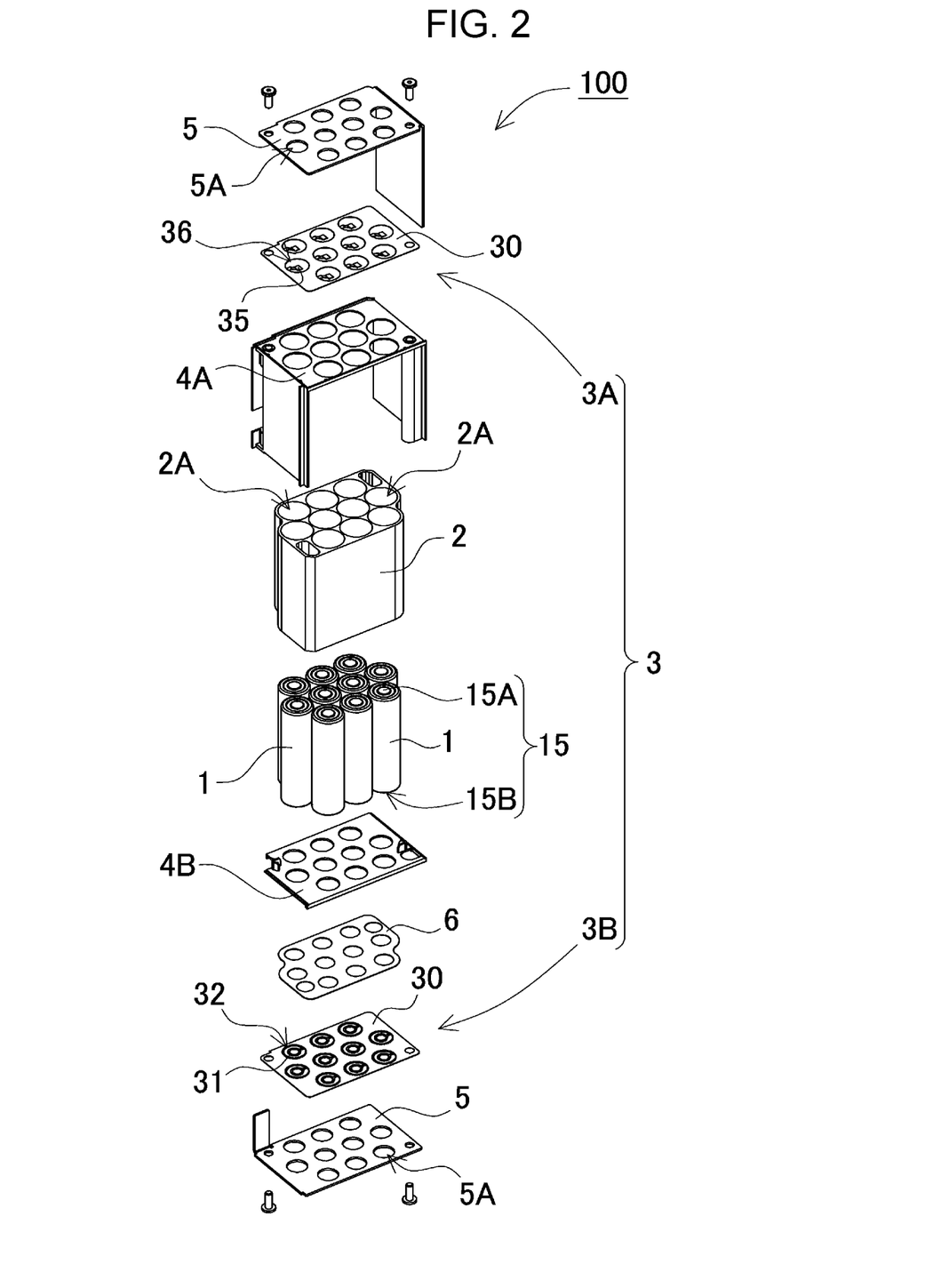
FIG. 2 is an exploded perspective view of the battery block illustrated in FIG. 1.

Battery block 100 shown in FIGS. 1 and 2, includes a plurality of cylindrical batteries 1. In battery block 100, the current can be enlarged by connecting cylindrical batteries 1 in parallel, and the output voltage can be increased by connecting cylindrical batteries 1 in series. The charge and discharge capacity can be enlarged by increasing the number of connected cylindrical batteries 1. Therefore, in battery block 100, the plurality of cylindrical batteries 1 are connected in series or parallel, in order to obtain the optimal output voltage, output current, and charge and discharge capacity for the use. Battery block 100 of the present invention is mainly used as a power source which provides power to a driving motor of electric vehicles, for example, such as, hybrid cars, plug-in hybrid cars, or electric cars. In the use other than electric vehicles, battery block 100 can be used as the use requiring a large output, for example, a power source of electric power storage use.

Battery block 100 shown in the exploded perspective view of FIG. 2, includes: the plurality of cylindrical batteries 1; battery holder 2 which disposes each of cylindrical batteries 1 in each of fixed locations; insulation holders 4A, 4B which cover both-ends surfaces of battery holder 2; lead plates 3 which are connected to positive and negative electrodes 15 of cylindrical batteries 1; current collecting plates 5 which are stacked and connected to lead plates 3; and insulation sheet 6 which is disposed between insulation holders 4A and lead plate 3. In battery block 100, the plurality of cylindrical batteries 1 are connected in parallel by lead plates 3. However, in battery block 100 of the present invention, cylindrical batteries 1 can be connected in parallel, or in series and parallel. However, in battery block 100 of the present invention, cylindrical batteries 1 can be connected in parallel, or in series and parallel.

In battery block 100 of FIG. 2, battery holder 2 disposes each of cylindrical batteries 1 in each of the fixed locations. Battery holder 2 includes a plurality of holding holes 2A which penetrate battery holder 2 so as to reach both surfaces. Cylindrical batteries 1 are inserted into these holding holes 2A, to dispose cylindrical batteries 1 in each of the fixed locations. Since all of cylindrical batteries 1 in battery block 100 of the figures are connected in parallel, all of cylindrical batteries 1 are inserted into holding holes 2A in the same direction, to dispose cylindrical batteries 1 in each of the fixed locations.

Cylindrical battery 1 is a nonaqueous secondary battery of a lithium ion secondary battery. As the lithium ion secondary battery has a large capacity to a weight, battery block 100 having cylindrical batteries 1 of lithium ion secondary batteries, can be reduced in weight, and can increase the charge and discharge capacity. Here, in the present invention, the cylindrical battery is not limited to the nonaqueous secondary battery. Then, the other type of the cylindrical battery can be used, as long as it has a exhaust valve which is opened when the inner pressure becomes higher than the threshold pressure at the bottom plate.

Figure 3:
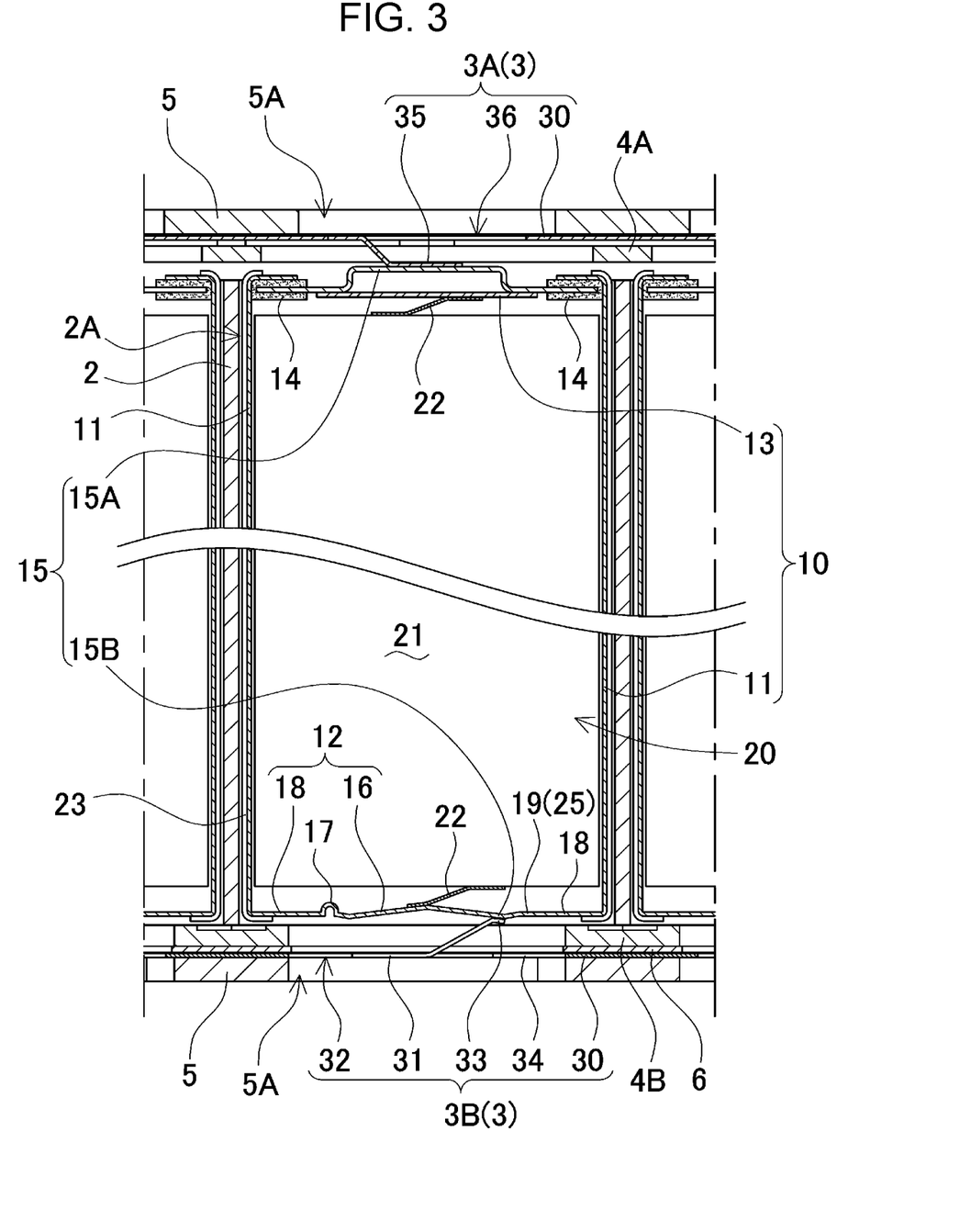
FIG. 3 is a sectional view of the battery block illustrated in FIG. 1 taken along line III-III.

As shown in FIG. 3, spiral electrode assembly 20 is made by a process where positive and negative electrode plates 21 are stacked and wound with separators. The spiral electrode assembly 20 and a nonaqueous electrolyte are stored or housed in battery can 10 made of metal. In battery can 10, bottom plate 12 closes a bottom surface of cylindrical outer can 11, and sealing plate 13 closes and seals a top opening portion of outer can 11. Sealing plate 13 is fixed to outer can 11 through insulating material member 14 in an airtight way and in an insulated state. Cylindrical battery 1 has electrodes 15 at both ends of a longitudinal direction. Cylindrical battery 1 of the lithium ion secondary battery includes projecting electrode 15A disposed at sealing plate 13 as a positive electrode, and bottom surface electrode 15B disposed at bottom plate 12 of outer can 11 as a negative electrode. Cylindrical battery 1 has a diameter of 18 mm and an entire length of 65 mm, and it is, so called, a type of "18650" of the lithium ion secondary battery. Then, cylindrical battery 1 can be also used which has a size similar to or bigger than this size in the lithium ion secondary battery.

In cylindrical battery 1, housed spiral electrode assembly 20 are connected to projecting electrode 15A of sealing plate 13 and bottom surface electrode 15B of bottom plate 12 through inner tabs 22. Since it is not necessary to open a plurality of exhaust valves simultaneously as conventional, inner tab 22 which connects bottom surface 15B to spiral electrode assembly 20, can have a strength of which inner tab 22 is broken by opening exhaust valve 16. A metal plate or a metal foil thinner than bottom plate 12, or a fine conductive wire is used as inner tab 22. In cylindrical battery 1 shown in the sectional view of FIG. 3, inner tab 22 is connected to the center of bottom plate 12 by welding.

Since inner tab 22 is broken or separated in a state of the open valve of exhaust valve 16, exhaust valve 16 can be opened widely. Here, inner tab 22 does not necessarily need to be the strength of which inner tab 22 is broken or separated in a state of the open valve of exhaust valve 16. Inner tab 22 which is not broken or separated, is deformed by opening exhaust valve 16 pulling. Then, as inner tab 22 is loosely connected to exhaust valve 16, inner tab 22 is stretched or drawn linearly without separating in a state of the open valve of exhaust valve 16.

Ring-shaped thin-walled line 17 which breaks at a threshold pressure is provided in bottom plate 12, and thin-walled line 17 has unconnected portion 19. Exhaust valve 16 having unconnected portion 19 as hinge part 25, is provided inside thin-walled line 17. Exhaust valve 16 is coupled to bottom plate 12 through hinge part 25, and is opened by breaking thin-walled line 17 and bending hinge part 25. In cylindrical battery 1 shown in the bottom surface view of FIG. 4 and the perspective view of FIG. 5, C-shaped thin-walled line 17 is disposed concentrically to circular bottom plate 12, and thereby loop-shaped thin-walled line 17 having unconnected portion 19, is formed. In the cylindrical battery in the figures, loop-shaped thin-walled line 17 having unconnected portion 19, is C-shaped. However, thin-walled line 17 is not limited to this shape. For example, thin-walled line 17 can be horseshoe-shaped, U-shaped, or a shape where both-tips of the U-shape are close each other. In exhaust valve 16, the lateral width of exhaust valve 16 is wider than the lateral width of hinge part 25, in other words, the lateral width (d) of exhaust valve 16 is wider than the space (d) of unconnected portion 19, and thereby exhaust valve 16 is easily opened in a state where thin-walled line 17 is broken, and the opening area at the time of opening the valve can be made big.

Exhaust valve 16 which opens as the result of thin-walled line 17 breaking, opens by bending hinge part 25. The threshold pressure of exhaust valve 16 is specified by the material of outer can 11 and the thickness of thin-walled line 17. Outer can 11 is made of iron, and the thickness of thin-walled line 17 is, for example, 30 μm to 100 μm. Loop-shaped thin-walled line 17 having unconnected portions 19, is made by press work at bottom plate 12 of outer can 11.

As shown in the sectional view of FIG. 3, thin-walled line 17 is provided by making bottom plate 12 thin in a line shape through press work. In bottom plate 12 of this figure, flat surface portion 18 is provided between thin-walled line 17 and the peripheral edge of bottom plate 12. Thin-walled line 17 has a U-shaped cross-section which projects inside outer can 11. Exhaust valve 16 is made a conical shape by press work, and has a mountain shape of which the center projects inside. Further, in this figure, the boundary portion of exhaust valve 16 to thin-walled line 17 projects on the outer side than flat surface portion 18 which is disposed at the peripheral portion of bottom plate 12. Inner tab 22 coupled to spiral electrode assembly 20, is connected to the center portion, that is, the projecting portion of the mountain shape of exhaust valve 16. In exhaust valve 16 of the conical shape, there is a little distortion in a state where the inner pressure is applied, and thereby it can surely break the whole of thin-walled line 17, to surely open largely.

Figure 4:
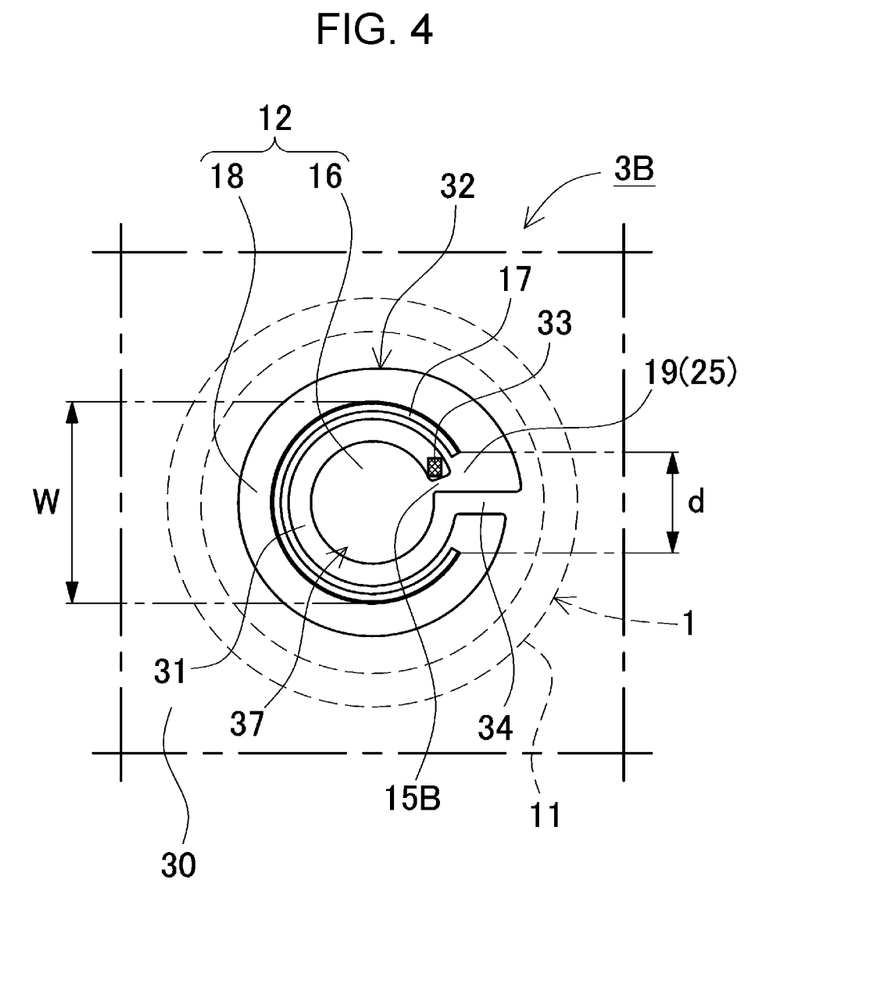
FIG. 4 is an enlarged bottom surface view showing a state where a lead plate is connected to a bottom plate of a cylindrical battery.

In bottom plate 12 shown in the sectional view of FIG. 3 and in the bottom surface view of FIG. 4, bottom surface electrode 15B is provided at hinge part 25 of exhaust valve 16 inside thin-walled line 17. In bottom plate 12 of FIG. 4, bottom surface electrode 15B is disposed at the inside of one end portion of thin-walled line 17. In bottom plate 12, the inside of thin-walled line 17 projects from the outside of thin-walled line 17, and bottom surface electrode 15B is disposed at this projecting portion. Therefore, lead plate 3 can be surely connected to bottom surface electrode 15B. Lead plate 3 can surely contact bottom surface electrode 15B without lead plate 3 contacting the outside of thin-walled line 17.

In cylindrical battery 1 of FIG. 3, a cylindrical portion of battery can 10 and a peripheral edge of bottom plate 12 at the outside of thin-walled line 17 are covered and insulated by insulation tube 23. Insulation tube 23 is a heat shrink tube, and also covers a peripheral portion of sealing plate 13 to insulate it.

In battery block 100 of FIG. 3, two sheets of lead plates 3 are disposed at both surfaces of battery holder 2. In battery block 100, one lead plate 3A is connected to projecting electrode 15A of cylindrical battery 1, and other lead plate 3B is connected to bottom surface electrode 15B which is disposed at bottom plate 12 of cylindrical battery 1, and cylindrical batteries 1 are connected in parallel.

Lead plates 3 is respectively made of a thin metal board, and are connected to electrodes 15 which are disposed at both edges of each of cylindrical batteries 1. one lead plate 3A is connected to projecting electrode 15A by spot welding, and other lead plate 3B is connected to bottom surface electrode 15B by ultrasonic-welding. In the ultrasonic-welding, the ultrasonic horn is pressed to the surface of lead plate 3B, and lead plate 3B is ultrasonically vibrated in a state where lead plate 3B is pressed to bottom surface electrode 15B, and lead plate 3B is coupled to bottom surface electrode 15B. In the ultrasonic-welding, lead plate 3B is ultrasonically vibrated in a direction parallel to the surface of bottom surface electrode 15B, and is connected to bottom surface electrode 15B. As lead plate 3 is connected to bottom surface electrode 15B by bonding the molecules of metals at the boundary face in the ultrasonic-welding, different kinds of metals are stably connected. Accordingly, lead plate 3B made of aluminum can be fixed to bottom plate 12 made of iron surely and stably.

However, in the present invention, the connection of lead plate 3 and electrode 15 of cylindrical battery 1, is not limited to spot welding or ultrasonic-welding. That is the reason why those are connected by using the optimal method for materials of the lead plate and the electrode. Accordingly, the lead plate can be connected by all of connecting structures or methods other than the above-mentioned connecting structure or method, for example, laser welding, soldering, or the like.

The stress is applied when the relative position of lead plate 3 to cylindrical battery 1 is shifted. Since lead plate 3 of the thin metal is easily resiliently deformed, the stress of lead plate 3 caused by the relative position shift to cylindrical battery 1, can be made small. Accordingly, lead plate 3 connected to electrode 15 is the thin metal plate having the thickness of, for example, 100 µm or more to 500 µm or less, preferably 100 µm or more to 300 µm or less. As the thin metal plate is easily resiliently deformed, lead plate 3B can be stably ultrasonically welded to bottom surface electrode 15B with a small output power. As the output power of the ultrasonic vibrator can be made small, the damage of thin-walled line 17 in the ultrasonic-welding process can be decreased.

Lead plate 3 of the thin metal plate has a high electric resistance. In battery block 100 of FIGS. 2 and 3, current collecting plate 5 is stacked on lead plate 3 to make the electric resistance small. Current collecting plate 5 is thicker than lead plate 3, and is an aluminum plate having a thickness of, for example, approximately 2 mm. Here, current collecting plate 5 can be the aluminum plate having a thickness of 1 mm or more, preferably 1.5 mm or more. Lead plate 3 and current collecting plate 5 are respectively aluminum plates, and lead plate 3 is connected to current collecting plate 5, and in battery block 100, lead plate 3 and current collecting plate 5 constitute a connecting lead, and such a connecting lead can be reduced in weight. Especially, by using the thick aluminum board as current collecting plate 5, while the electric resistance of current collecting plate 5 is decreased, it can be reduced in weight. Here, lead plate 3 and current collecting plate 5 can be respectively made of a metal board other than the aluminum board, for example, copper, nickel, iron, or an alloy of these metals. Further, as the property of the metal is improved by adding a different kind of metal, the word of "metal" is used as the meanings including its alloy in this specification. Accordingly, for example, the aluminum board is used as the meanings including aluminum alloy board.

One lead plate 3A is connected to projecting electrode 15A by spot welding. In lead plate 3A, as shown in FIGS. 2 and 3, connecting board 35 coupled to main body portion 30 is connected to projecting electrode 15A. Lead plate 3A shown in FIGS. 2 and 3, opens coupling hole 36 at a location corresponding to electrode 15 of cylindrical battery 1, and is provided with connecting board 35 connected to electrode 15, at a location of this coupling hole 36. These coupling hole 36 and connecting board 35 are made by punching the aluminum board. In one lead plate 3A, connecting board 35 is connected to projecting electrode 15A by spot welding.

Figure 5:
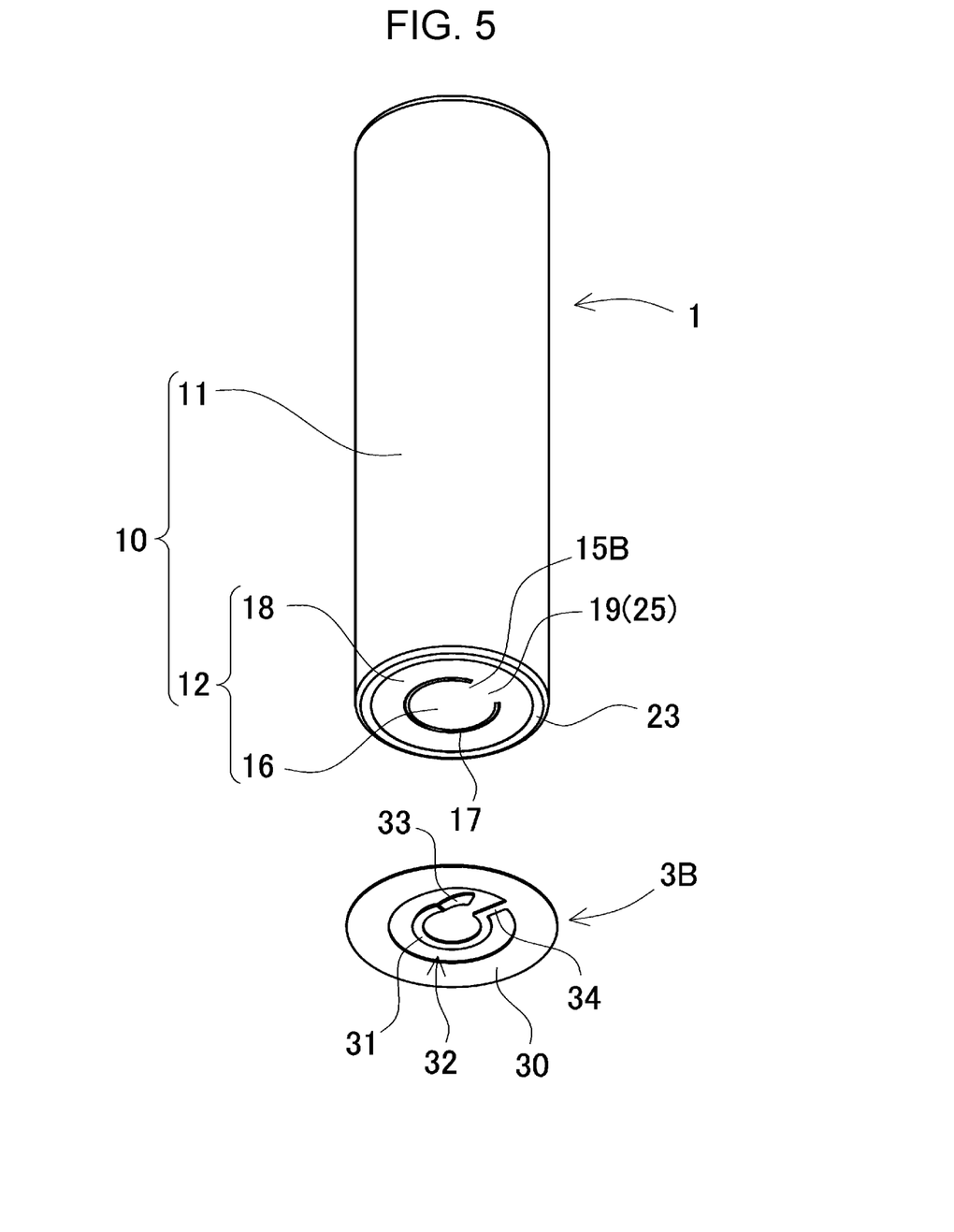
FIG. 5 is a perspective view of the cylindrical battery and the lead plate as viewed from the bottom surface.

As shown in FIGS. 3 to 5, other lead plate 3B connected to bottom surface electrode 15B, includes cut-out portion 32 at a location facing an area including thin-walled line 17. Other lead plate 3B includes resilient arms 31 of which tip portions 33 are connected to the bottom surface electrodes 15B and roots 34 are provided in positions facing the hinge parts 25 of exhaust valves 16, and width of root 34 of resilient arm 31 is narrower than width of hinge part 25 of exhaust valve 16. Further, resilient arm 31 is in a loop-shape which extends along the inside of thin-walled line 17. This other lead plate 3B is provided with cut-out portions 32, 37 outside and inside of resilient arm 31, and the outer cut-out portion 32 and the inner cut-out portion 37 are coupled at a location facing hinge portion 25. Cut-out portion 32 disposed at the outside of resilient arm 31, is in a ring-shape having the predetermined width corresponding to the inside and the outside of thin-walled line 17. Cut-out portion 37 disposed at the inside of resilient arm 31, is in a circular shape. Here, In FIG. 4, the coupling portion of bottom surface electrode 15B and tip portion 33 of resilient arm 31, is shown by cross hatching.

Resilient arm 31 which extends along the inside of thin-walled line 17, is in a ring-shape, and the rear end portion of resilient arm 31 is coupled to main body portion 30 outside cut-out portion 32, through root 34 which extends outside in the radial direction. In resilient arm 31 of FIG. 4, the width of root 34 of resilient arm 31 is narrower than the width of hinge part 25, and ring-shaped resilient arm 31 has the same width as root 34, and thereby the whole of resilient arm 31 is made flexible and easily deformed. In bottom plate 12 of cylindrical battery 1 shown in FIG. 5, the inner lateral width of thin-walled line 17 is narrower than the outer lateral width of thin-walled line 17.

In bottom plate 12, resilient arm 31 is disposed at a location which is close to the inner periphery of thin-walled line 17, and this can make the entire length long. Thereby, the long resilient arm 31 can be made more flexible and easily deformed. Further, in bottom plate 12 of this shape, the probability is small that the outer peripheral edge of opened exhaust valve 16 hits main body portion 30 which is disposed outside cut-out portion 32 of other lead plate 3B. Therefore, exhaust valve 16 can be surely opened. The outside of cut-out portion 32 of other lead plate 3B is not deformed, being different from resilient arm 31. Therefore, in a case where exhaust valve 16 hits this outside, exhaust valve 16 cannot be opened stably.

In the process where tip portion 33 of resilient arm 31 is ultrasonic-welded to bottom surface electrode 15B, resilient arm 31 which is long and easily deformed is flexibly deformed. Therefore, resilient arm 31 can be connected to bottom surface electrode 15B with energy of less ultrasonic vibration. Further, the relative position shift of the adjacent cylindrical battery 1, can be reasonably absorbed. Accordingly, the stress of lead plate 3 caused by the relative position shift to cylindrical battery 1, can be made small, and the stress which is applied to the coupling portion of other lead plate 3B and bottom surface electrode 15B, can be made small, and other lead plate 3B can be stably connected to bottom surface electrode 15B. Further, resilient arm 31 is easily deformed at the time of opening exhaust valve, and the opening area of exhaust valve 16 can be made big.

A state where exhaust valve 16 disposed at bottom plate 12 is opened, is shown in the sectional view of FIG. 3. As shown in this figure, when the inner pressure becomes higher than the threshold pressure, thin-walled line 17 is broken in bottom plate 12, and exhaust valve 16 is opened by tilting exhaust valve 16 through hinge part 25 of unconnected portion 19. Exhaust valve 16 deformed at hinge part 25, is tilted and opened in a state where exhaust valve 16 passes through cut-out portion 32. Thus, the opening area of exhaust valve 16 is not restricted by lead plate 3, and exhaust valve 16 can be largely opened, to smoothly exhaust the inner gas. Further, in battery block 100 shown in FIG. 6, exhaust duct 40 is provided outside current collecting plate 5, which exhaust the inner gas discharged from cylindrical battery 1 to the outside. As shown in this figure, exhaust valve 16 opened in the tilted posture, changes the flow direction of the inner gas to the exhausting direction of exhaust duct 40, and the gas can be smoothly exhausted from exhaust duct 40.

Current collecting plates 5 are respectively stacked outside lead plates 3, and connected to lead plates 3. In order to connect to electrodes 15 of cylindrical battery 1, current collecting plates 5 respectively open connecting holes 5A at locations corresponding to electrodes 15 of cylindrical battery 1. In a state where current collecting plate 5 is stacked outside lead plate 3, lead plate 3 is spot-welded or ultrasonic-welded to electrode 15 through this connecting hole 5A.

INDUSTRIAL APPLICABILITY

The battery block of the present invention, is a battery block where a plurality of cylindrical batteries each having an exhaust valve are connected by lead plates. The battery block can be suitably used as a power source which provides power to a driving motor of electric vehicles, for example, such as, hybrid cars, or electric cars, or a power source of stationary electric power storage facilities.

The invention claimed is:

1. A battery block, comprising:
   a plurality of cylindrical batteries of each of which the two ends are formed as positive and negative electrodes; and
   lead plates which are connected to the electrodes of the cylindrical batteries,
   wherein each of the cylindrical batteries are provided with a battery can having a bottom plate provided with a bottom surface electrode and an exhaust valve,
   the exhaust valve which is provided in the bottom plate opens as a result of thin-walled lines breaking at a threshold pressure,
   the exhaust valve is provided inside the thin-walled line of a loop-shape provided in the bottom plate, said thin-walled line having an unconnected portion,
   the unconnected portion forms a hinge part,
   the bottom surface electrode provided in the bottom plate connects one of the lead plates to the hinge part,
   the one of the lead plates has parts corresponding to each of the cylindrical batteries,
   each of the parts of the one of the lead plates has a cut-out portion provided in a position facing an area including the thin-walled line, and
   each of the parts of the one of the lead plates includes a resilient arm of which a tip portion is connected to the bottom surface electrode and a root is provided in a position facing the hinge part of the exhaust valve, and
   a width of the root of the resilient arm is narrower than a width of the hinge part of the exhaust valve.

2. The battery block according to claim 1, wherein the resilient arm is in a loop-shape which extends along the inside of the thin-walled line.

3. The battery block according to claim 1, wherein, each of the parts of the lead plates is connected to the corresponding bottom surface electrode by ultrasonic-welding.

4. The battery block according to claim 1, wherein, an inner tab which is connected to an electrode plate housed in the battery can, is welded to an inner surface of the exhaust valve,
   the inner tab is a metal plate thinner than the bottom plate from which the exhaust valve separates in a state of a broken valve.

5. The battery block according to claim 1, wherein, each of the parts of the lead plates connected to the corresponding bottom surface electrode electrodes, is a metal plate having a thickness of 100 μm or more to 500 μm or less,
   the metal plate is made of any one of aluminum, copper, nickel, iron, or an alloy of these metals.

6. The battery block according to claim 5, wherein, a current collecting plate thicker than the one of the lead plates is connected to the one of the lead plates connected to the bottom surface electrode.

7. The battery block according to claim 1, wherein, each of the cylindrical batteries is a nonaqueous secondary battery.

* * * * *